Figure 3:
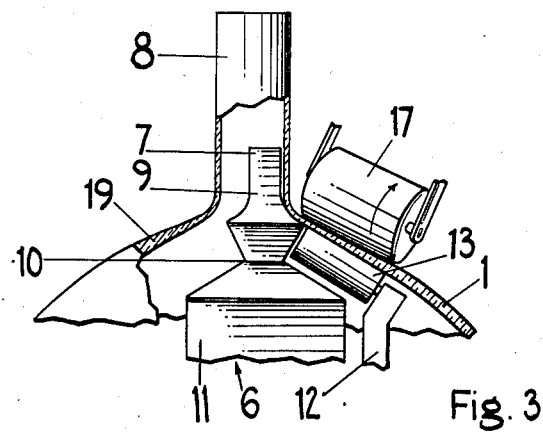

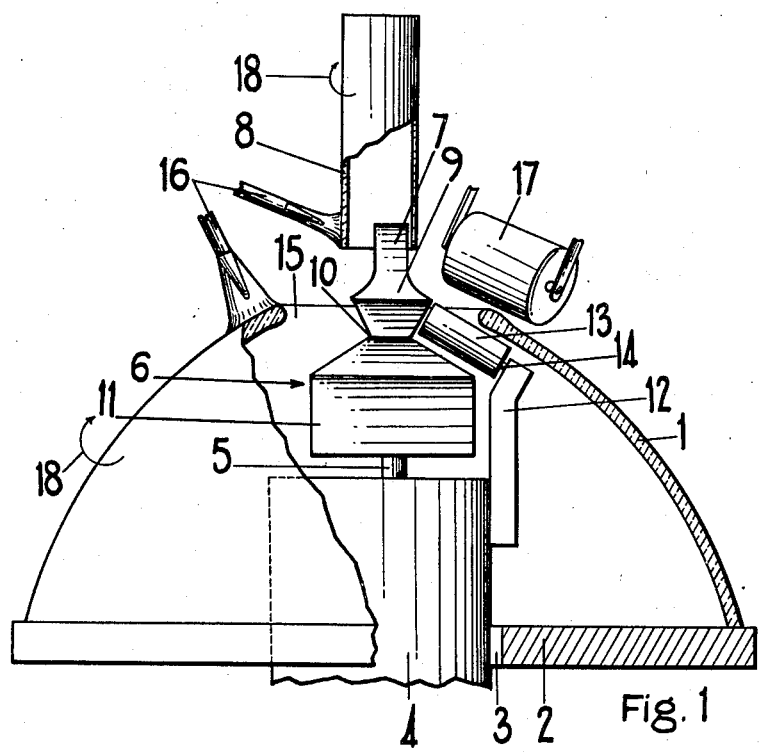
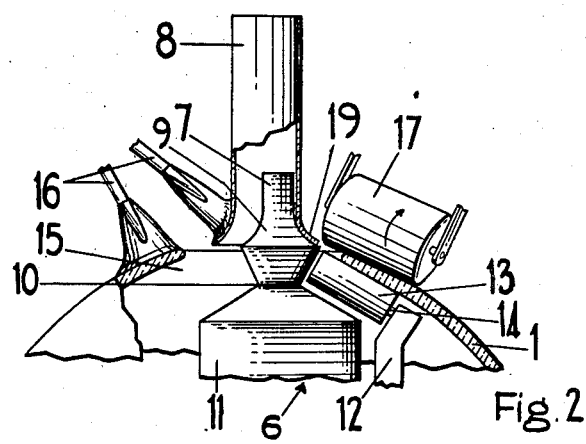

United States Patent Office 2,922,256
Patented Jan. 26, 1960

2,922,256

METHODS OF SEALING A TUBULAR GLASS NECK PORTION TO A GLASS WALL

Robert Leonard Breadner, Kenton, and Charles Henry Simms, East Twickenham, England, assignors to The General Electric Company Limited, London, England Application August 2, 1956, Serial No. 601,702

Claims priority, application Great Britain August 22, 1955

3 Claims. (Cl. 49—82)

This invention relates to a method of sealing a tubular glass neck portion to, so that it extends from an aperture in, a glass main wall portion, and relates more particularly, though not exclusively, to the manufacture of glass envelopes of the kind consisting of a body portion which is in the approximate shape of a hollow truncated cone (and which will hereinafter be referred to as the conical section or cone), an end section closing the wider end of the conical section, and a tubular neck-section forming the narrower end of the conical section, the invention being mainly concerned with the sealing of the neck-section to the narrower end of the conical section in the manufacture of glass envelopes of this kind. Such envelopes are required, for example, for cathode ray tubes of the kind used for television reception, and the invention is especially concerned with the manufacture of glass envelopes of the kind referred to for cathode ray tubes.

In one known method of manufacturing such envelopes, the conical section is formed with a closed narrower end by pressing in a suitably shaped mould, the closed narrower end is subsequently cut off at a diameter greater than the tubular neck-section, and the latter is provided with a flared end which is sealed to, so as to continue, the narrower end of the truncated conical section. In some cases a short intervening flared glass tube is sealed to the narrower end of the conical section and a simple cylindrical tube, which constitutes the tubular neck, is sealed to the end of this intervening tube.

It is usually desirable for the wall thickness of the tubular neck to be as small as practicable, for example, in order to enhance the effect on the electron beam of magnetic deflection coils located outside the neck; on the other hand the wall thickness of the conical section is necessarily great owing to the fact that it is made by pressing, so that in the manufacture of glass envelopes by the above method the flared end of the neck, or of the intervening tube where employed, has to be of graded thickness to enable a satisfactory seal to be made; in addition the abutting surfaces of the flare and the narrower end of the cone have to be accurately shaped so as to fit closely to each other for satisfactory sealing to take place. However, the separate steps involved in accurately shaping the flare and said abutting surfaces often render such a method of sealing a tubular neck-section to a conical section in the manufacture of cathode ray tube envelopes of the above kind difficult and costly to effect, and the main object of the present invention is to provide an alternative method of sealing a tubular neck-section to a conical section in the manufacture of such envelopes which is less subject to the above disadvantage.

The method in accordance with the invention is, however, of more general application and can be used in other cases where it is required to seal a relatively thin-walled tubular neck-portion to, so that it extends from an aperture in, a relatively thick main-wall portion, as will be appreciated from the following further description.

According to the present invention a method of sealing a relatively thin-walled tubular glass neck-portion to, so that it extends from an aperture in, a relatively thick glass main-wall portion, comprises the steps of supporting the neck-portion coaxially with respect to a circular hole which is formed in the main-wall portion in the position in which the neck portion is to be sealed and which is of greater diameter than the neck portion, with the adjacent end of the neck portion spaced from the hole, heating the part of the main-wall portion surrounding the hole and the nearer end of the neck-portion so as to soften the glass, feeding the neck-portion axially towards the main-wall portion against a flaring tool which produces a flaring out of the heat-softened end of the neck portion, and squeezing the glass surrounding the hole in the main-wall portion between a pair of co-operating rollers so as to reduce its thickness at the hole approximately to that of the flared-out end of the neck portion, the movement of the latter being continued so as to bring it into contact with the main-wall portion for effecting the sealing of the two portions together, the flaring tool and rollers being so arranged that the walls of the neck-portion and main-wall portion meet in substantially the same plane and merge smoothly into each other in the region of the seal without an abrupt change in wall thickness.

Preferably the said rollers are so shaped and arranged that in addition to thinning the heat-softened glass of the main-wall portion, they urge it towards and into contact with the flared-out end of the neck portion for facilitating the sealing.

The size of the hole formed in the main-wall portion in the position in which the tubular neck-portion is to be sealed will depend on the diameter of the neck-portion and on the relative thickness of the main-wall portion and neck-portion, and in one particular example, when sealing a tubular neck-portion of approximately 32 millimetres internal diameter and 2.5 millimetres wall thickness to a main-wall portion having a wall thickness of 6 millimetres, a hole of approximately 65 millimetres was found to be suitable; the diameter of the hole required for producing the best results when sealing together main-wall portions and tubular neck-portions of different dimensions may readily be found by approximation and trial. However, the size of the hole is not critical and slight variations from a circular shape may be tolerated since such variation will be neutralised on the squeezing of the glass surrounding the hole between the said rollers during the sealing process.

Preferably the main-wall portion and neck-portion are arranged to rotate at the same angular velocity about their common axis, that is to say the axis of the hole in the main-wall portion, during the sealing process for enabling the glass to be uniformly heated without the need for rotating burners, and also for enabling the said rollers to rotate about fixed axes as the process is carried out.

Thus the main-wall portion and neck-portion are conveniently arranged to rotate about a vertical axis, the neck-portion being sealed to the main-wall portion from above, and in such an arrangement the neck-portion may be arranged to be fed towards the main-wall portion, for effecting the flaring out of the lower end of the neck-portion by gravity under its own weight.

In some cases the roller which is arranged to make contact with the surface of the main-wall portion opposite to that presented to the neck-portion may itself provide the said flaring tool, the shape and arrangement of the roller being such that as the neck-portion is fed towards and into contact with the roller it effects the required flaring out of the end of the neck-portion.

In an alternative arrangement, however, the flaring tool comprises a third roller substantially in the form of a cylinder of smaller diameter than the bore of said neck-portion and having an outwardly extending flare at one end, the roller being arranged with its cylindrical end directed towards the neck-portion and with its axis parallel to, but offset from, the axis of the neck-portion, and the main-wall portion and the neck-portion are arranged to be rotated at the same angular velocity as each other about the common axis of the neck-portion and the hole in the main-wall portion during the sealing process, the roller being so arranged that as the neck portion is fed towards the main-wall portion, the flared part of the roller effects the required flaring out of the end of the neck-portion and the cylindrical part extends into the neck-portion for supporting the adjacent part of the wall against inwards distortion during the sealing process.

The rollers which effect the squeezing of the softened glass surrounding the hole in the main-wall portion are preferably inclined towards each other in the direction of the neck so as to produce a progressive decrease in the wall thickness of the main-wall portion towards the neck, and whilst it may be possible for these rollers to be arranged so that their axes each lie in a plane extending through the common axis of the neck-portion and said hole, it may in some cases be found that with such an arrangement the softened glass has a tendency to be squeezed outwards away from, rather than towards, the flared-out end of the neck-portion during the sealing process, and this may be avoided by arranging the axis of one or each said roller slightly skew with respect to the axis of rotation of the neck portion in such a direction that on rotation of the main-wall portion relative to the rollers the softened glass is urged inwards in the direction of the neck-portion.

The method in accordance with the invention may be used for sealing a tubular member to, so that it extends from an aperture in, a planar main-wall portion, although the invention is more particularly concerned with the sealing of a tubular neck-section to the narrower end of a conical section in the manufacture of glass envelopes for cathode ray tubes.

Thus in the manufacture of such envelopes in accordance with the invention, the conical section is initially formed with a closed narrower end which is subsequently removed to provide a hole in the narrower end of the cone having a diameter greater than that of the tubular neck-section, the neck-section is supported outside the conical section coaxially with said hole, the adjacent ends of the tubular neck-section and conical section are heated to soften the glass, the neck-section is fed axially towards the conical section against a flaring tool located within the conical section and which flares out the heat-softened end of the neck-section, and the glass wall surrounding the hole formed in the narrower end of the conical section is squeezed between a pair of co-operating rollers so as to urge it towards and into contact with the flared-out end of the neck-section for effecting the sealing of the neck-section to the conical section, the flaring tool and rollers being so arranged that the walls of the neck-section and conical section meet in substantially the same plane and merge smoothly into each other in the region of the seal without an abrupt change in wall thickness.

Such a method has an advantage over the known methods previously referred to of sealing a tubular neck-section to a conical section in the manufacture of a cathode ray tube envelope since it is not necessary to preform the flare at the end of the neck-section or to shape accurately the abutting ends of the neck-section and conical section before the sealing process, and slight inaccuracies in the shape of the hole formed in the narrower end of the conical section may be tolerated as previously explained. Moreover the size of the hole is not critical, and this enables the hole in the conical section to be formed by burning off the closed narrower end immediately after the section has been pressed in a mould, instead of cutting it off to an accurate diameter at a subsequent stage, as in the said known method previously referred to.

It will be appreciated that in a method of sealing a tubular neck-section to a main-wall portion in accordance with the invention, the squeezing of the softened glass surrounding the hole in the main-wall portion by the said rollers may commence before the flaring out of the adjacent end of the neck-portion, if desired, depending, for example, on the relative wall-thickness of the main-wall portion and the neck-portion. It will also be appreciated that, in general, there will be a tendency of the wall thickness of the flared-out end of the tubular neck-portion to be increased slightly on coming into contact with the glass of the main-wall portion, and the rollers should be so arranged that the wall thickness diminishes only gradually towards the main tubular part of the neck-portion at the completion of the sealing process. By suitably shaping the flaring tool and the rollers, and suitably spacing the latter, a close control over the dimensions of the glass wall in the region of the seal can readily be obtained, which is important in the manufacture of cathode ray tube envelopes.

One method of sealing a relatively thin-walled tubular neck-section to the narrower end of a thicker-walled glass conical section in the manufacture of an envelope for a cathode ray tube will now be described by way of example with reference to Figures 1 to 3 of the accompanying schematic drawings, which represent progressive stages of the sealing process, a modified form of the apparatus being shown in Figure 4 of the drawings.

Thus referring to Figure 1 of the drawings, a pressed glass cone 1 which constitutes the said conical part of a cathode ray tube envelope, and which is shown partly in section, is arranged to be carried on the top surface of a flat horizontal face plate 2 with its narrower end uppermost, the face plate being arranged to rotate about a vertical axis and the cone 1 being secured coaxially to the face plate by any suitable means (not shown) so as to rotate with the plate about their common axis. The cone 1, which has a wall thickness of 6 millimetres, is open at both ends, the hole at the narrower end being formed by burning off the closed end of the cone, after pressing, at a diameter of 65 millimetres.

Located at the centre of the face plate 2 is a circular aperture 3 and extending co-axially through this aperture, perpendicularly to the plate, is a cylindrical metal support 4, the support carrying at its upper end a shaft 5, extending parallel to, but offset from, the axis of the support and carrying, in turn, a freely rotatable roller 6.

The upper part 7 of the roller is in the form of a cylinder having a diameter which is less than the inner diameter of the tubular neck-section 8 which is to be sealed to the cone 1, the roller being flared outwards at the lower ends of this cylindrical part, and being provided beneath the flare 9 with a deep annular groove 10 of substantially tri-angular cross-section in planes containing the axis, the lower edge of the groove meeting the cylindrical base part 11 of the roller as shown.

The support 4 also carries, from an arm 12 extending upwards therefrom at the side of the roller 6, a second roller 13 in the form of a cylinder, this second roller being arranged to rotate freely about a shaft 14 extending inwards and upwards from the arm at such an angle that the inner part of the roller lies within the annular groove 10 formed in the roller 6 and being so positioned that in the vertical plane passing through the axes of the two rollers the top of the roller 13 forms a smooth continuation of the upper surface of the flare 9, the separation between the roller 13 and the flare being as small as practicable.

When the cone 1 is secured to the face plate 2 the top part of the roller 6 just projects through the circular hole 15 formed at the narrower end of the cone, with the inner surface of the cone immediately surrounding the hole just out of contact with the top of the roller.

The glass tube 8, which is required to be sealed to the narrower end of the cone 1 so as to constitute the tubular neck-section as aforesaid, has an internal diameter of 32 millimetres and wall-thickness of 2.5 millimetres and is held coaxially above the narrower end of the cone 1 in a rotatable support, which support is also movable in a vertical direction for lowering the tube into contact with the flange 9 on the roller 6.

In carrying out the sealing process in accordance with the invention, the narrower end of the cone 1 and the lower end of the tube 8 are heated by suitably placed gas burners 16 (only two of which are shown) so as to soften the glass, whilst the cone and the tube are rotated at the same angular velocity in the direction indicated by the arrows 18, and the support carrying the tube is slowly lowered until the lower end of the tube makes contact with the upper surface of the flare 9 on the roller 6. At this point the tube is released from its fixing relative to the support so as to be able to fall under its own weight, the support nevertheless continuing to maintain the tube with its axis vertical and to rotate it at the same angular velocity. At the same time as the tube is lowered a cylindrical external roller 17 is brought down on to the upper surface of the glass surrounding the hole 15 at the narrower end of the cone, immediately above the roller 13, so as to press the softened glass into contact with the roller 13 and decrease the thickness of the glass wall of the cone in this region (see Figure 2), the softened glass being squeezed inwards towards the axis of the cone. Meanwhile the weight of the glass tube 8 causes the softened glass wall at its lower end to be flared outwards due to contact with the flare 9 on the roller 6.

The angles at which rollers 13 and 17 are arranged with respect to each other is such that the gap between them narrows towards the axis of the cone and for ensuring that the glass is not squeezed outwards away from the flared-out lower end of the glass tube 8 the roller 17 is set slightly skew with respect to the roller 13 and the axis of rotation of the face plate 2 in such a direction that rotation of the roller 17, caused by contact with the outer surface of the glass cone 1, tends to urge the glass inwards.

Continued pressure between the rollers 13, 17 causes the glass of the cone 1 to be squeezed into contact with the flare 19 formed at the lower end of the tube 8 (see Figure 3) the glass walls of the flare and the conical section meeting in substantially the same plane at a diameter of approximately 50 millimetres, the pressure being maintained for a short while after contact takes place in order to cause the tube and the cone to be sealed together. The wall thickness of the flare 19 will tend to be increased on coming into contact with the glass of the cone 1, but the angles at which the rollers are set and the final distance between them at the completion of the sealing process are such that there is no abrupt change in wall thickness at the region of the seal, the thickness of the flare decreasing gradually from the seal to the main part of the tube 8, and the wall thickness of the cone increasing gradually from the seal to the main part of the cone.

After completion of the sealing process the external roller 17 is withdrawn and the glass cone 1 with the tubular neck-portion sealed thereto is removed from the face-plate 2 and annealed.

If desired, for facilitating the removal of the cone 1 from the face plate 2, the support 4 carrying the rollers 6 and 13 may be arranged to be withdrawn in a downward direction thereby taking the rollers out of contact with the surface of the glass.

The manufacture of the cathode ray tube having an envelope comprising a conical section and tubular neck-section sealed together as described by way of example may be completed in known manner by sealing an end plate carrying a luminescent screen on its inner surface, to the wider open end of the conical section, and mounting an electrode assembly within the neck-section.

A further advantage obtained in sealing the tubular neck-section to a conical section in the manufacture of a cathode ray tube envelope in accordance with the invention is that the sealing can be performed without the formation of an undesirably pronounced annular groove or ridge on the inner surface of the envelope at the junction of the neck and conical section, as is sometimes the case with some envelopes in which the sealing of the neck to the conical section is carried out by other methods, and this facilitates the coating of the inner surface of the conical section and adjacent part of the neck with a smooth continuous layer of graphite or other conducting layer, as is usually required in cathode ray tubes of the kind employed for television reception.

In addition it is sometimes desirable to construct a cathode ray tube envelope with the neck-section and conical section of different glasses, and the sealing process in accordance with the invention provides a convenient method of constructing an envelope of this kind; for example, the tube which is arranged to provide a neck-section may be formed of a lead-glass having a relatively high electrical resistance, and the thicker walled conical section may be formed of a relatively inexpensive soda-glass.

Figure 4:
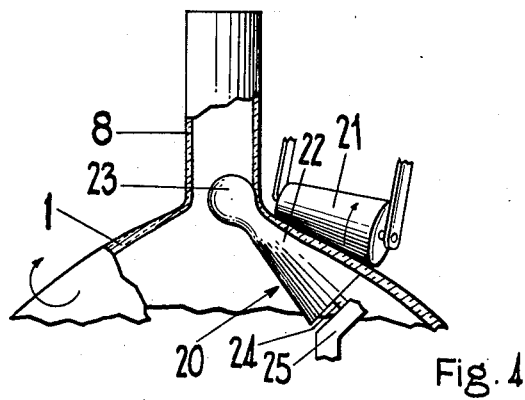

In Figure 4 there is shown schematically a modified form of the apparatus described with reference to Figures 1 to 3, the rollers 6 and 13 in the previously described apparatus being replaced by a single roller 20 which, in addition to co-operating with an external roller 21 for squeezing the softened glass at the narrower end of the cone 1, also flares out the lower end of the tube 8.

Thus the roller 20 comprises a frusto-conical portion 22 terminated at the smaller end by a bulbous end portion 23 of approximately spherical shape, the surfaces of the two portions meeting in a smooth curve.

The roller is mounted on a shaft 24 extending upwardly at approximately 45° from a support 25 with the bulbous end uppermost and so positioned that during the sealing of the glass tube 8 to the cone 1, which sealing is carried out in a similar manner to that described with reference to Figures 1 to 3, the lower end of the tube meets the curved surface of the roller 20 between the frusto-conical portion and the bulbous end portion, and is flared outwards to meet the glass wall of the cone which is being simultaneously squeezed between the frusto-conical portion of the roller and the external roller 21; the bulbous end portion 23 of the roller 20 also prevents inward deformation of the wall of the tube 8 during the sealing process in a similar manner to the cylindrical part of the roller 6 in the apparatus previously described.

In this figure, which shows the cone 1 and tube 8 at the completion of the sealing process, the external roller 21 is also shown in the shape of a truncated cone, the use of the rollers of this shape reducing the amount of slip which takes place between the rollers and the surface of the glass with which they come into contact during the sealing process.

It will be appreciated, however, that the rollers 13 and 17 of the apparatus shown in Figures 1, 2 and 3 may also be frusto-conical shape if desired.

The advantage of the arrangement shown in Figure 4 is that there is no possibility of a slight ridge being formed on the inside of the envelope at the junction of the neck and conical section as might occur in some cases with apparatus as shown in Figures 1 to 3 if the width of the gap between roller 13 and the flare 9 of the roller 6 is too great.

Preferably the support 25 carrying the roller 20 is arranged to be lowered after the completion of the sealing process for withdrawing the roller from contact with the glass, so as to facilitate the removal of the cone 1, with the neck section sealed thereto, from the apparatus.

It will be appreciated that in the manufacture of a cathode ray tube envelope by a method according to the invention, the conical section referred to need not necessarily be of circular cross-section, but may, for example, be of square or rectangular cross-section in planes perpendicular to its axis.

We claim:

1. A method of sealing a relatively thin-walled tubular glass neck-portion to, so that it extends from an aperture in, a relatively thick glass main-wall portion, comprising the steps of positioning the neck-portion co-axially with respect to a circular hole which is formed in the main-wall portion in the location in which the neck portion is to be sealed and which is of greater diameter than the neck portion, with the adjacent end of the neck portion spaced from the hole, heating the part of the main-wall portion surrounding the hole and the nearer end of the neck portion, so as to soften the glass, moving the neck portion axially towards the main-wall portion while simultaneously flaring out the heat-softened end of the neck portion, squeezing the glass surrounding the hole in the main-wall portion so as to reduce its thickness at the hole approximately to that of the flared out end of the neck portion, continuing the movement of the neck portion so as to bring it into contact with the main-wall portion and effect the sealing of the two portions together, the degree of flaring of the end of the neck portion and the squeezing of the glass surrounding the hole in the main-wall portion being so controlled that the walls of the neck portion and main-wall portion meet in substantially the same plane and merge smoothly into each other in the region of the seal without an abrupt change in wall thickness.

2. A method of sealing a tubular neck-section to the conical section in the manufacture of a glass envelope for a cathode ray tube wherein the conical section is initially formed with a closed narrower end which is subsequently removed to provide a hole in the narrower end of the cone having a diameter greater than the external diameter of the tubular neck-section: said method including the steps of positioning the neck-section outside the conical section and coaxially with said hole, heating the adjacent ends of the tubular neck-section and conical section to soften the glass, moving the neck-section axially toward the conical section, flaring the heat-softened end of the neck-section outwardly, and squeezing the glass wall surrounding the hole formed in the narrower end of the conical section and thereby urging it towards and into contact with the flared out end of the neck-section to effect the sealing of the neck-section and the conical section together, the flaring of the neck-section and the squeezing of the glass at the narrower end of the conical section being so effected that the walls of the neck-section and conical section meet in substantially the same plane and merge smoothly into each other at the region of the seal without an abrupt change in wall thickness.

3. A method of sealing a tubular neck-section to the conical section in the manufacture of a glass envelope for a cathode ray tube wherein the conical section is initially formed with a closed narrower end which is subsequently removed to provide a hole in the narrower end of the cone having a diameter greater than the external diameter of the tubular neck-section: said method including the steps of positioning the cone with its axis vertical and its narrower end uppermost, positioning the neck-section above the conical section coaxially with the hole at the narrower end of the conical section, rotating the conical section and neck-section about their common axis at the same angular velocity, heating the narrower end of the conical section and the lower end of the neck-section to soften the glass, moving the neck-section axially downwardly against a flaring tool projecting upwardly through the hole at the narrower end of the conical section and thereby flaring out the heat-softened lower end of the neck-section, and squeezing the glass wall surrounding the hole at the narrower end of the conical section and thereby urging it towards and into contact with the flared out end of the neck-section to effect the sealing of the neck-section and the conical section together, the flaring of the neck-section and the squeezing of the glass at the narrower end of the conical section being so effected that the walls of the neck-section and conical section meet in substantially the same plane and merge smoothly into each other in the region of the seal without an abrupt change in wall thickness.

References Cited in the file of this patent

UNITED STATES PATENTS

| | | |
|---|---|---|
| 2,151,840 | Dichter | Mar. 28, 1939 |
| 2,695,477 | Van Steenis | Nov. 30, 1954 |
| 2,715,298 | Buttino | Aug. 16, 1955 |
| 2,731,771 | Harder | Jan. 24, 1956 |
| 2,799,123 | Van Steenis | July 16, 1957 |

FOREIGN PATENTS

| | | |
|---|---|---|
| 337,431 | Great Britain | Nov. 3, 1930 |
| 720,948 | Great Britain | Dec. 29, 1954 |